US012430168B2

(12) United States Patent
Fong et al.

(10) Patent No.: US 12,430,168 B2
(45) Date of Patent: *Sep. 30, 2025

(54) SCHEDULE MANAGEMENT FOR MACHINE LEARNING MODEL-BASED PROCESSING IN COMPUTING ENVIRONMENT

(71) Applicant: Dell Products L.P., Round Rock, TX (US)

(72) Inventors: Victor Fong, Melrose, MA (US); Kenneth Durazzo, Morgan Hill, CA (US)

(73) Assignee: Dell Products L.P., Round Rock, TX (US)

( * ) Notice: Subject to any disclaimer, the term of this patent is extended or adjusted under 35 U.S.C. 154(b) by 468 days.

This patent is subject to a terminal disclaimer.

(21) Appl. No.: 17/681,299

(22) Filed: Feb. 25, 2022

(65) Prior Publication Data

US 2023/0273813 A1    Aug. 31, 2023

(51) Int. Cl.
*G06F 9/46* (2006.01)
*G06F 9/48* (2006.01)
*G06F 9/50* (2006.01)
*G06N 5/04* (2023.01)

(52) U.S. Cl.
CPC .......... *G06F 9/4881* (2013.01); *G06F 9/5027* (2013.01); *G06N 5/04* (2013.01)

(58) Field of Classification Search
CPC .... G06F 9/4881; G06F 9/5027; G06F 9/5033; G06F 9/5038; G06F 9/5044; G06F 9/505; G06F 9/5055; G06F 9/5072; G06F 9/5077; G06F 2209/501; G06F 2209/5021; G06F 2209/506; G06F 2209/485

See application file for complete search history.

(56) References Cited

U.S. PATENT DOCUMENTS

| | | | |
|---|---|---|---|
| 8,781,909 B2 * | 7/2014 | Sanamrad | G06Q 10/06395 705/7.41 |
| 10,109,030 B1 * | 10/2018 | Sun | G06T 1/20 |
| 10,726,335 B2 * | 7/2020 | Yosinski | G06F 17/16 |
| 10,970,633 B1 * | 4/2021 | Gweon | G06N 20/10 |

(Continued)

OTHER PUBLICATIONS

L. Wang et al., "Peeking Behind the Curtains of Serverless Platforms," USENIX Annual Technical Conference, Jul. 2018, 13 pages.

(Continued)

*Primary Examiner* — April Y Blair
*Assistant Examiner* — Zhi Chen
(74) *Attorney, Agent, or Firm* — Ryan, Mason & Lewis, LLP

(57) ABSTRACT

Techniques are disclosed for schedule management for machine learning model-based processing in a computing environment. For example, a method receives a machine learning model-based request and determines a scheduling decision for execution of the machine learning model-based request. Determination of the scheduling decision comprises identifying, based on one or more metrics, at least one cluster from a plurality of clusters as an execution environment in which the machine learning model-based request is to be executed. The machine learning model-based request may then be forwarded to the at least one identified cluster for execution.

20 Claims, 11 Drawing Sheets

(56) References Cited

U.S. PATENT DOCUMENTS

| | | | | |
|---|---|---|---|---|
| 2005/0117587 | A1* | 6/2005 | Kawato | H04L 47/724 370/395.21 |
| 2013/0047164 | A1* | 2/2013 | Ujibashi | G06F 9/4881 718/104 |
| 2015/0277982 | A1* | 10/2015 | Iwata | G06F 9/505 718/103 |
| 2018/0024863 | A1* | 1/2018 | Jagadeesh | G06F 9/4881 709/226 |
| 2018/0067558 | A1* | 3/2018 | Eagleman | G09B 21/04 |
| 2019/0138908 | A1* | 5/2019 | Bernat | G06N 3/105 |
| 2020/0175362 | A1* | 6/2020 | Zhang | G06N 3/04 |
| 2020/0320392 | A1* | 10/2020 | Lin | G06N 3/082 |
| 2020/0364574 | A1* | 11/2020 | Kim | G06N 3/045 |
| 2020/0380367 | A1* | 12/2020 | Gupta | G06F 18/2155 |
| 2021/0271520 | A1* | 9/2021 | Basu | G06N 3/08 |
| 2021/0279635 | A1* | 9/2021 | Gadelrab | G06N 3/063 |
| 2021/0406744 | A1* | 12/2021 | Dutt | G06F 16/24545 |
| 2022/0292303 | A1* | 9/2022 | Cao | G06F 11/3051 |
| 2022/0414503 | A1* | 12/2022 | Park | G06F 9/4881 |
| 2023/0103149 | A1* | 3/2023 | Yu | G06N 3/045 706/21 |

OTHER PUBLICATIONS

F. Romero et al., "INFaaS: Automated Model-less Inference Serving," USENIX Annual Technical Conference, Jul. 2021, 15, pages.

Wikipedia, "Edge Computing," https://en.wikipedia.org/w/index.php?title=Edge_computing&oldid=1073476548, Feb. 22, 2022, 7 pages.

The Kubernetes Authors, "Cluster Architecture," https://kubernetes.io/docs/concepts/architecture/_print/, Accessed Feb. 25, 2022, 23 pages.

\* cited by examiner

| ID | Model ID | Size | Actual Size | HW | Performance | Accuracy |
|---|---|---|---|---|---|---|
| 1 | Model-1 | Original | 313 MB | Intel CPU Model-1 | 63ms | 87.13% |
| 2 | Model-1 | Original | 313 MB | NVIDIA GPU Model1 | 32ms | 87.13% |
| 3 | Model-1 | Original | 313 MB | AMD GPU Model-1 | 63ms | 87.13% |
| 4 | Model-1 | Large | 267 MB | Intel CPU Model-1 | 57ms | 86.57% |
| 5 | Model-1 | Medium | 115 MB | Intel CPU Model-1 | 34ms | 83.91% |
| 6 | Model-1 | Small | 73 MB | Intel CPU Model-1 | 21ms | 78.89% |
| 7 | Model-1 | Extra Small | 42 MB | Intel CPU Model-1 | 15ms | 72.12% |
| 8 | Model-1 | Tiny | 23 MB | Intel CPU Model-1 | 10ms | 64.79% |

FIG. 3

| Model ID | Size | Execution | TTL |
|---|---|---|---|
| Model-1 | Small | Cluster 1 | 4m 16s |
| Model-2 | Small | Cluster 2 | 3m 47s |
| Model-3 | Small | Cluster 1 | 3m 12s |
| Model-7 | Small | Cluster 3 | 2m 15s |
| Model-8 | Small | Cluster 4 | 2m 10s |
| Model-13 | Small | Cluster 1 | 1m 53s |
| Model-16 | Small | Cluster 2 | 1m 42s |

FIG. 6

| SLA Type | SLA Value |
|---|---|
| Cost (Monthly) | $0.003 |
| Performance | 50ms |
| Accuracy | 75% |

FIG. 7

| Cluster | Hardware | Model Size | Execution Time | Input Transmission Time | Model Download Time | Performance | Cost Per Second | Cost |
|---|---|---|---|---|---|---|---|---|
| Cluster 1 | Intel CPU Model-1 | Small | 21 | 57 | 98 | 176 | 0.003 | 0.00063 |
| Cluster 1 | NVIDIA GPU Model-1 | Small | 18 | 57 | 98 | 173 | 0.01 | 0.0018 |
| Cluster 1 | AMD GPU Model-1 | Small | 19 | 57 | 98 | 174 | 0.01 | 0.0019 |
| Cluster 2 | Intel CPU Model-1 | Small | 21 | 12 | 73 | 106 | 0.004 | 0.00084 |
| Cluster 2 | Intel CPU Model-1 | Medium | 34 | 12 | 0 | 46 | 0.004 | 0.00136 |
| Cluster 3 | Intel CPU Model-1 | Small | 21 | 13 | 0 | 34 | 0.004 | 0.00084 |

FIG. 8

SCHEDULE MANAGEMENT FOR MACHINE LEARNING MODEL-BASED PROCESSING IN COMPUTING ENVIRONMENT

FIELD

The field relates generally to information processing, and more particularly to management of information processing systems.

BACKGROUND

Machine learning (ML) application programs and microservices utilize ML models, which typically have a training mode and an inference mode. In the training mode, model parameters (sometimes also referred to as model hyperparameters) of the ML model are adjusted to optimize for accuracy. Once the ML model is trained with acceptable accuracy, it can then be used for the inference mode. The inference mode is the process of entering new input to the trained ML model, which then generates and outputs a prediction based on one or more pre-defined computations using the optimized parameters. This inference mode process is also referred to as inference serving. While inference serving using a trained ML model typically consumes fewer virtualized computing resources (e.g., containers, virtual machines, and the like) than the training mode, schedule management of model execution on the virtualized computing resources can pose significant technical problems depending on the computing environment in which the inference serving functionality is deployed.

SUMMARY

Embodiments provide techniques for schedule management for machine learning model-based processing in a computing environment.

For example, in one illustrative embodiment, a method receives a machine learning model-based request and determines a scheduling decision for execution of the machine learning model-based request. Determination of the scheduling decision comprises identifying, based on one or more metrics, at least one cluster from a plurality of clusters as an execution environment in which the machine learning model-based request is to be executed. The machine learning model-based request may then be forwarded to the at least one identified cluster for execution.

While techniques described herein are particularly well-suited for inference serving in an edge computing environment, embodiments are not limited thereto.

These and other illustrative embodiments include, without limitation, methods, apparatus, networks, systems and processor-readable storage media.

BRIEF DESCRIPTION OF THE DRAWINGS

FIG. 3 illustrates an example of a model look-up data structure for use in schedule management for machine learning inference serving according to an illustrative embodiment.

FIG. 6 illustrates an example of a scheduling decision cache data structure for use in schedule management for machine learning inference serving according to an illustrative embodiment.

FIG. 7 illustrates an example of a service level agreement data structure for use in schedule management for machine learning inference serving according to an illustrative embodiment.

FIG. 8 illustrates an example of a cost and performance data structure for use in schedule management for machine learning inference serving according to an illustrative embodiment.

DETAILED DESCRIPTION

Figure 1:
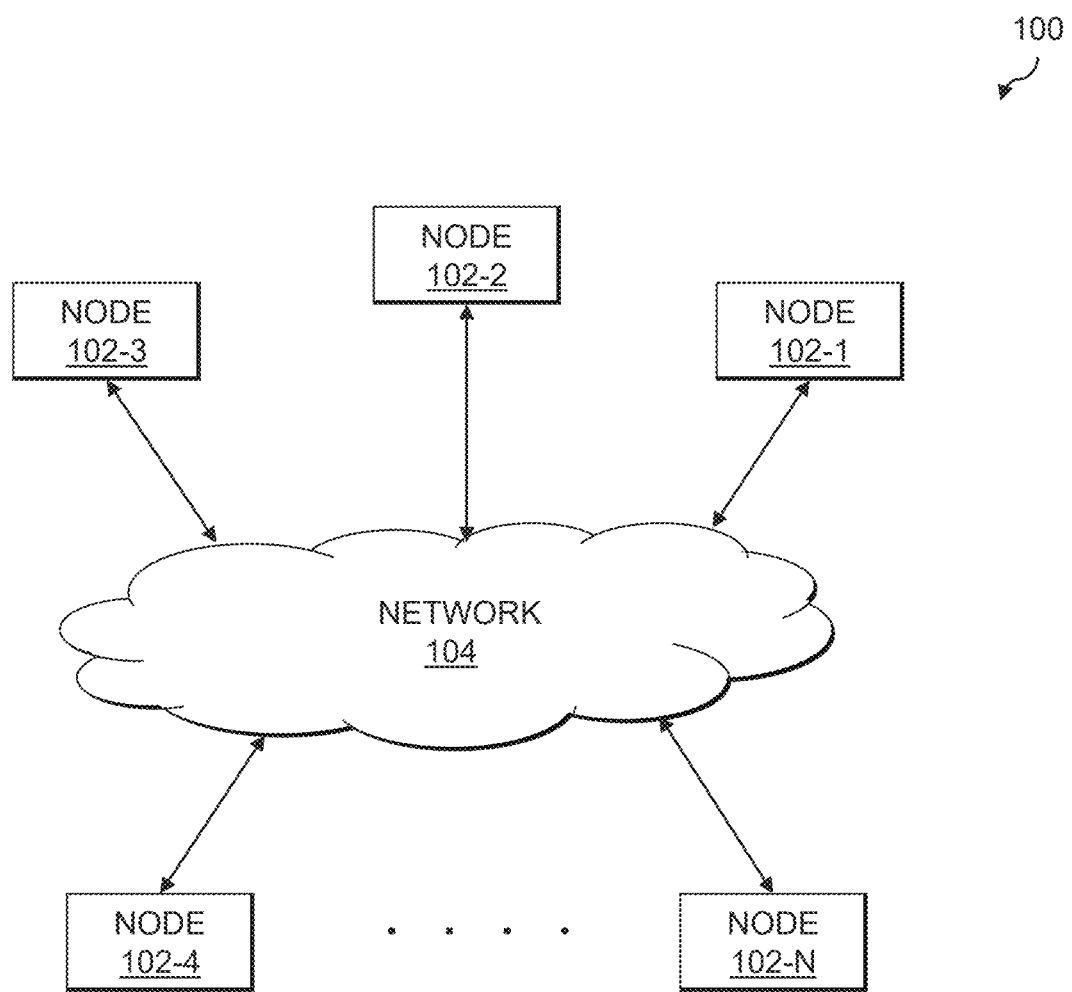
FIG. 1 illustrates a computing environment within which one or more illustrative embodiments can be implemented.

As mentioned, schedule management (scheduling) of model execution on virtualized computing resources (e.g., containers, virtual machines, and the like) can pose significant technical problems depending on the computing environment in which inference serving functionality for an ML model is deployed. Currently, there are standards for defining ML models, computations and parameters in pre-defined file formats (e.g., Open Neural Network Exchange or ONNX), so that ML models of varied sizes can be processed in similar manners. As further mentioned above, inference serving refers to the process of accepting input, performing an inference computation based on the input, and responding with a computation result. It is realized herein that, aside from pre-processing input data, the core implementation of inference serving can be re-used for different applications and microservices. However, existing approaches for ML model processing have their own technical shortcomings, as will be explained below.

For example, consider a Function-as-a-Service (FaaS) execution environment for ML model processing, where FaaS workloads or functions are typically short-lived with the ability to scale down to zero instances. The lifecycle of a function can be measured in seconds. Some implementations have maximum execution times, e.g., about two minutes. These workloads are executed in isolated containers which are subject to cold-start times. Cold-start time refers to the time it takes to allocate and start the container from scratch, as will be further explained below.

Further, Inference-as-a-Service (INFaaS) refers to ML inference serving platforms that can provide a model-less experience to users, based on user-defined requirements such as accuracy, performance, and cost. However, current INFaaS platforms are cloud-based (i.e., implemented on a cloud computing platform) and do not take into account workload scheduling dimensions associated with edge computing platforms which can include heterogeneous execution environments, latencies, model transmissions, bandwidths, etc.

As is known, edge computing is a distributed computing paradigm wherein data computation and/or data storage is performed at or close to a location where the data is produced. This is in comparison to cloud or core computing paradigms wherein data computation and/or data storage is performed at a more centralized location (e.g., data center) that is not necessarily at or close to the data source.

Still further, ML models such as deep neural network (DNN) models are available in different sizes (even ones with the same objective), i.e., different numbers of layers and parameters. There are several mechanisms to compress DNN models to reduce their sizes. DNN models of larger sizes require more computing resources and take longer to perform inference serving, but have greater accuracy over smaller-sized models. Model compression is typically a trade-off between size and accuracy.

It is further realized herein that, with the significant increase in the implementation of the edge computing paradigm, potential execution locations of workloads increase to the range of millions. The tasks of manually configuring and managing millions of heterogeneous execution environments is unrealistic and developers would not be able to do that for each microservice and function created.

Illustrative embodiments overcome the above and other technical problems associated with existing ML processing approaches by providing a cluster-less, server-less, and model-less INFaaS platform that can be used in computing environments including, but not limited to, edge, cloud, and core computing environments. Such a computing platform enables, inter alia, developers and data scientists to deploy new ML models or existing ML models, and specify execution requirements and service level agreements. Advantageously, the INFaaS platform is configured to select the appropriate ML model and execution environment.

Note that the terms server-less, model-less and cluster-less do not necessarily mean that servers, models and clusters (i.e., groups of computing nodes used to execute one or more workloads) are not used to execute a given application or microservice. Rather, the respective terms generally mean that a developer or data scientist need not be concerned with scaling of servers, models and clusters since those features are automatically or at least semi-automatically managed (abstracted) by the computing platform upon which the application or microservice is developed and/or deployed.

It is realized herein that illustrative embodiments overcome many technical problems attributable to implementing an INFaaS platform with cluster-less, server-less and model-less characteristics. More particularly, illustrative embodiments described herein provide techniques for selecting model and execution environments based on many different variables. While edge scheduling is generally a significant technical problem, INFaaS introduces additional challenges with model selection and heterogeneous execution environments. Furthermore, the characteristics of DNN inference workloads also provide additional motivation for optimizations, as will be further explained herein.

In addition to basic service level agreement (SLA) dimensions for cluster-less edge computation (such as, but not limited to, accuracy, cost, performance, latency, bandwidth, etc.), edge INFaaS also introduces additional dimensions including, but not limited to, model selection and model compression.

The accuracy of each model impacts a scheduling decision, as some environments lack sufficient computing resources to execute larger models. The model selection further impacts cost and performance, as larger models require more computing resources, resulting in higher costs. Large models also have longer execution times and typically take longer to download into the execution environment, resulting in increased performance overhead.

Referring initially to FIG. 1, a computing environment 100 is depicted within which one or more illustrative embodiments can be implemented. As generally shown, a plurality of nodes 102-1, 102-2, 102-3, 102-4, . . . , 102-N (which may hereinafter be referred to collectively as nodes 102, and individually as node 102) are operatively coupled to one another via a network 104.

In some embodiments, computing environment 100 may be an exemplary information processing system with associated computers, servers, storage devices and other processing or computing devices. Each node 102 may be one or more of the above types of processing or computing devices. It is to be appreciated, however, that embodiments are not restricted to use with any particular system and/or device configurations. Accordingly, the term "information processing system" as used herein is intended to be broadly construed, so as to encompass, for example, processing systems comprising computing and storage systems, as well as other types of processing systems comprising various combinations of physical and virtual processing resources.

For example, an information processing system may comprise at least one data center or other type of cloud-based system that includes one or more clouds hosting tenants that access cloud resources. Such a system may also be referred to as a core system. Alternatively, an information processing center may comprise an edge-based system that includes one or more edge computing platforms with edge devices and/or edge gateways that operate in accordance with an edge computing paradigm. Still further, embodiments may comprise a combination of cloud/core-based devices and edge-based devices, and/or other types of computing devices. Nodes 102 in computing environment 100 are intended to represent any one or more of the types of devices illustratively mentioned above, as well as other types of devices.

For example, nodes 102 may comprise client devices, e.g., physical computing devices such as Internet of Things (IoT) devices, mobile telephones, laptop computers, tablet computers, desktop computers or other types of devices utilized by members of an enterprise, in any combination. Such devices are examples of what are more generally referred to herein as processing devices. Some of these processing devices are also generally referred to herein as computers or computing devices. The client devices may also or alternately comprise virtualized computing resources, such as virtual machines (VMs), containers, etc. The client devices in some embodiments comprise respective computers associated with a particular company, organization or other enterprise. In addition, at least portions of computing environment 100 may also be referred to herein as collectively comprising an enterprise. Numerous other operating scenarios involving a wide variety of different types and arrangements of processing nodes are possible, as will be appreciated by those skilled in the art.

Still further, nodes 102 may comprise mini-computers. A mini-computer may be implemented as a single-board computer (SBC), a computer-on-module (COM) or system on a module (SOM), an embedded computer system, a system on chip (SoC), a system in a package (SiP), an integrated circuit, a hardware accelerator, etc. A mini-computer illustratively has its own process and memory space, and is capable of executing an operating system (OS) in a stand-alone fashion (e.g., separate from a host OS that runs or executes on a client device).

Nodes 102 may take on various form factors. For example, in some embodiments, nodes 102 may be implemented as embedded components of client devices. In other embodiments, nodes 102 may be implemented as external pluggable devices. In still other embodiments, some client devices may be configured with embedded functionalities of nodes 102 while other client devices are connected to external pluggable components with functionalities of nodes 102.

In addition, nodes 102 may comprise one or more servers, gateways, or other types of devices forming systems including, but not limited to, edge computing platforms, cloud infrastructure comprising one or more clouds (e.g., one or more public clouds, one or more private clouds, one or more hybrid clouds, combinations thereof, etc.), and/or core computing platforms.

The network 104 may be implemented using multiple networks of different types. For example, the network 104 may comprise a portion of a global computer network such as the Internet, although other types of networks can be part of the network 104 including a wide area network (WAN), a local area network (LAN), a satellite network, a telephone or cable network, a cellular network, a wireless network such as a WiFi or WiMAX network, a storage area network (SAN), or various portions or combinations of these and other types of networks. The network 104 in some embodiments therefore comprises combinations of multiple different types of networks each comprising processing devices configured to communicate using Internet Protocol (IP) or other related communication protocols.

The term "user" herein is intended to be broadly construed so as to encompass numerous arrangements of human, hardware, software or firmware entities, as well as combinations of such entities.

Although not explicitly shown in FIG. 1, one or more input-output devices such as keyboards, displays or other types of input-output devices may be used to support one or more user interfaces to nodes 102, as well as to support communication between nodes 102 and other related systems and devices not explicitly shown. Further, at least portions of the functionality of nodes 102 may be implemented at least in part in the form of software that is stored in memory and executed by a processor.

Nodes 102 in the FIG. 1 embodiment are assumed to be implemented using at least one processing platform, with each processing platform comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

Nodes 102 may be implemented on respective distinct processing platforms, although numerous other arrangements are possible. For example, in some embodiments at least portions of nodes 102 are implemented on the same processing platform, while others of nodes 102 are implemented on other processing platforms.

The term "processing platform" as used herein is intended to be broadly construed so as to encompass, by way of illustration and without limitation, multiple sets of processing devices and one or more associated storage systems that are configured to communicate over one or more networks. For example, distributed implementations of nodes 102 are possible, in which certain ones of nodes 102 reside in a first geographic location while other ones of nodes 102 reside in at least a second geographic location that is potentially remote from the first geographic location. Numerous other distributed implementations of nodes 102 are possible.

Additional examples of processing platforms utilized to implement portions of computing environment 100 in illustrative embodiments will be described in more detail below in conjunction with FIGS. 11 and 12.

It is to be understood that the particular functionalities of nodes 102 are presented by way of illustrative example only and, in other embodiments, additional or alternative functionalities may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

By way of further example, in one illustrative embodiment, nodes 102 may be nodes in a container orchestration platform such as, but not limited to, a Kubernetes framework. Kubernetes is an open-source system for automating application deployment, scaling, and management within a container-based information processing system comprised of components referred to as pods, nodes and clusters, as will be further explained below in the context of FIG. 2. Types of containers that may be implemented or otherwise adapted within the Kubernetes system include, but are not limited to, Docker containers or other types of Linux containers (LXCs) or Windows containers. Kubernetes has become a prevalent container orchestration system for managing containerized workloads. It is rapidly being adopted by many enterprise-based information technology (IT) organizations to deploy their application programs (applications). By way of example only, such applications may include stateless (or inherently redundant applications) and/or stateful applications. Non-limiting examples of stateful applications may include legacy databases such as Oracle, MySQL, and PostgreSQL, as well as other stateful applications that are not inherently redundant. While the Kubernetes container orchestration system is used to illustrate various embodiments, it is to be understood that alternative container orchestration systems can be utilized.

Some terminology associated with the Kubernetes container orchestration system will now be explained. In general, for a Kubernetes environment, one or more containers are part of a pod. Thus, the environment may be referred to, more generally, as a pod-based system, a pod-based container system, a pod-based container orchestration system, a pod-based container management system, or the like. As mentioned above, the containers can be any type of container, e.g., Docker container, etc. Furthermore, a pod is typically considered the smallest execution unit in the Kubernetes container orchestration environment. A pod encapsulates one or more containers. One or more pods are executed on a worker node. Multiple worker nodes form a cluster (i.e., a group of worker nodes wherein each worker nodes executes one or more pods/containers). A Kubernetes cluster is managed by a least one manager or administrator node. A Kubernetes environment may include multiple clusters respectively managed by one or more administrator nodes. Furthermore, pods typically represent the respective processes running on a cluster. A pod may be configured as a single process wherein one or more containers execute one or more functions that operate together to implement the process. Pods may each have a unique Internet Protocol (IP) address enabling pods to communicate with one another, and for other system components to communicate with each pod. Still further, pods may each have persistent storage volumes associated therewith. Configuration information (configuration objects) indicating how a container executes can be specified for each pod.

While a Kubernetes framework is illustratively described above, it is to be appreciated that alternative embodiments are not limited to any particular container orchestration system. That is, while descriptions of subsequent figures refer to worker nodes and administrator nodes, it is to be understood that these terms are intended to generally refer to any processing or computing devices, physical and/or virtual, and not necessarily limited to the meanings given to them in the context of Kubernetes or other conventional container orchestration frameworks.

Accordingly, as will be further explained herein, illustrative embodiments provide automated orchestration techniques across multiple clusters with intelligent model selection and inter-cluster scheduling decisions.

Figure 2:
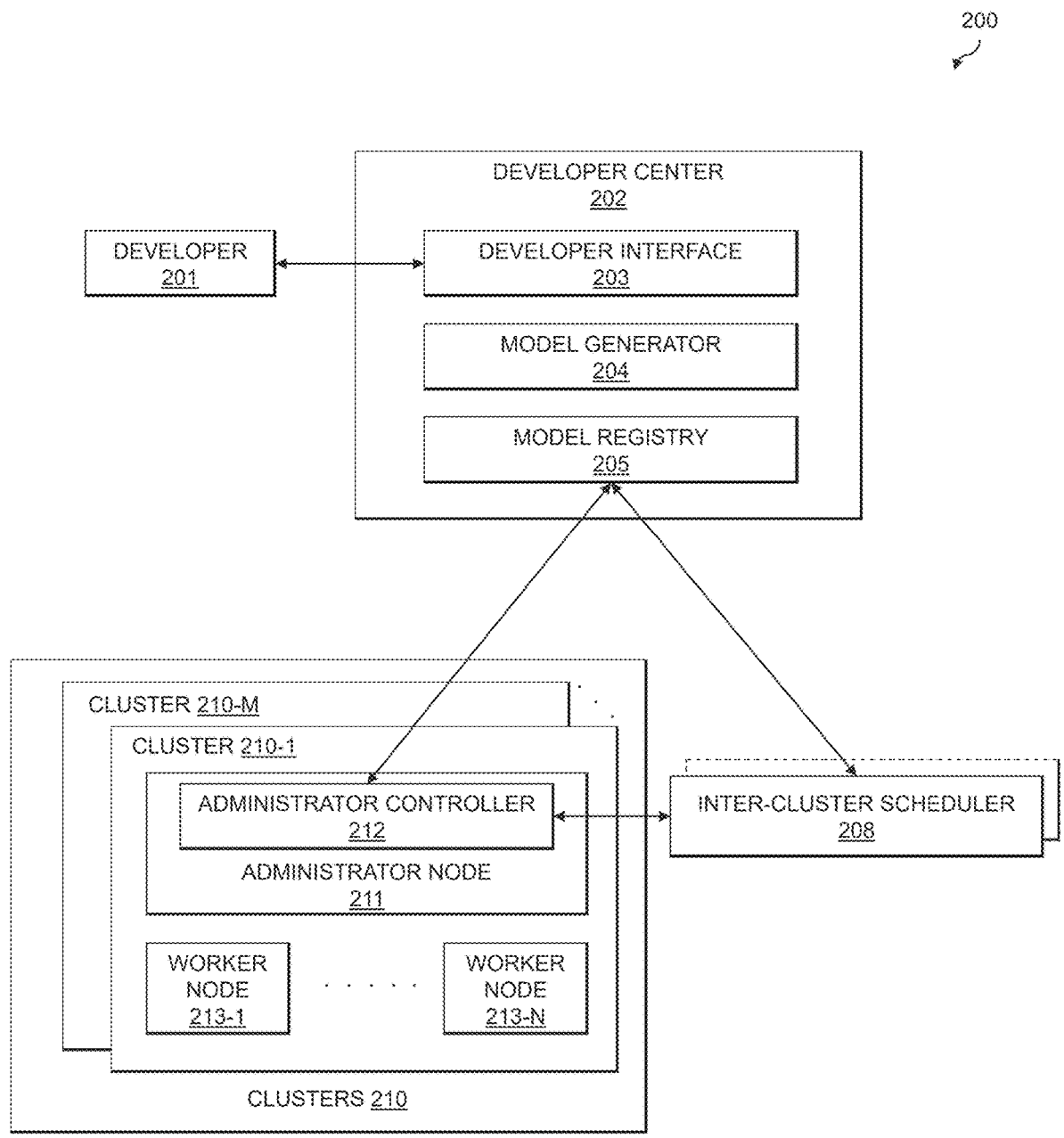
FIG. 2 illustrates an orchestration architecture configured to enable schedule management for machine learning inference serving according to an illustrative embodiment.

FIG. 2 illustrates an orchestration architecture 200 configured to enable inter-cluster schedule management for machine learning inference serving according to an illustrative embodiment. Note that components shown in FIG. 2 can be implemented by one or more of nodes 102 of FIG. 1. Further, while a container is the virtualized computing resource being managed in this illustrative embodiment, it is to be understood that other types of virtualized computing resources can be managed in alternative embodiments. Note that while the definition of the term cluster as illustratively used herein may comprise a Kubernetes cluster, the term is intended to have a broader meaning and is not limited to Kubernetes or any other particular container orchestration platform.

More particularly, as shown, orchestration architecture 200 enables a developer 201 to access a developer center 202 which comprises a developer interface 203, a model generator 204, and a model registry 205. Orchestration architecture 200 further comprises an inter-cluster scheduler 208 operatively coupled to model registry 205. In a distributed implementation, as will be further explained below, there can be multiple instances of inter-cluster scheduler 208 as denoted by the dashed box behind inter-cluster schedule 208 in FIG. 2. Still further, orchestration architecture 200 comprises a plurality of clusters 210 including clusters 210-1, . . . , 210-M (hereinafter collectively referred to as clusters 210 and individually as cluster 210). Each of clusters 210 comprises an administrator node 211, with an administrator controller 212, and a plurality of worker nodes 213-1, . . . , 213-N (hereinafter collectively referred to as worker nodes 213 and individually as worker node 213). Administrator controller 212 is operatively coupled to model registry 205 and to inter-cluster scheduler 208. In one or more illustrative embodiments, orchestration architecture 200 is part of an INFaaS platform implemented within an edge computing environment.

It is to be understood that other connections between components/nodes in FIG. 2 exist but are not expressly shown as they are within the understanding of one of ordinary skill in the art and/or otherwise further explained herein. Further, it is to be understood that in a Kubernetes implementation, FIG. 2 components labeled cluster, administrator node, and worker node are configured with Kubernetes functionalities described herein and/or otherwise known. Functionalities and interrelationships between FIG. 2 components will now be further explained.

In one or more illustrative embodiments, developer center 202 is a centralized processing environment for ML-based application/microservice developers, e.g., developer 201, using developer interface 203 to, inter alia, access model generator 204 and model registry 205.

Developer interface 203 is configured to enable developer 201 to use INFaaS functionalities. More particularly, developer 201 uses developer interface 203 to create one or more inference instances. For example, to create an inference instance, developer 201 specifies two types of input to developer interface 203: (i) the ML model to be used in the inference serving; and (ii) service level agreement criteria (SLA metrics) for the inference serving. For each inference instance, developer 201 can select a well-known model from an existing model catalog or other model source, or upload its own custom model. If developer 201 uploads its own custom model, the custom model should be in a format supported by the INFaaS platform.

Developer 201 then selects SLA metrics based on desired use cases. There are many different types of SLA metrics, but three useful metrics are performance, cost, and accuracy. Other SLA metrics comprise bandwidth, geographical restrictions (for policy and compliance), and compression for storage. Default metric values can be set in some embodiments so that developer 201 does not have to specify every SLA detail and can rather focus on specifying and/or adjusting the ones more critical for a particular use case. For example, a default minimum accuracy metric of 70% could be set and developer 201 can change that criterion if so desired.

As mentioned, developer 201 can select models from an existing model catalog, which may be uploaded by one or more vendors in some embodiments. When using these models, vendors who upload them are able to charge using a billing model configured on a per-usage basis (e.g., based on the number of inference instances) and/or a per-time-period basis (e.g., based on a time-subscribed parameter). Some mechanisms of model compression require re-training a new model, which also requires a training dataset. When vendors are uploading their models, the training dataset can also be uploaded for re-training purposes.

Model generator 204 is configured to compress models (i.e., generate compressed models) from an existing model catalog and/or user-uploaded models into different sizes. Models with smaller sizes typically have lower accuracy. In one or more illustrative embodiments, model generator 204 utilizes structured pruning and quantization to reduce the size of a model. In some embodiments, model generator 204 utilizes automations to auto-compress models by testing different compression algorithms and searching for optimized hyperparameters. Depending on implementation of the existing model catalog, there can be different standardized model sizes. After compression, each model is stored in model registry 205. Model generator 204 is also configured to execute inferences of different models on different hardware to benchmark performance.

Model registry 205 stores original and compressed models of different sizes from different vendors and users. Further, model registry 205 provides unique uniform resource locators (URLs) for downloading these models and provides authentication and authorization functionalities.

FIG. 3 illustrates a non-limiting example of a model look-up table 300 that is maintained in model registry 205.

It is to be appreciated that, in an INFaaS platform, there can be millions of clusters across a large geographical location. Thus, in orchestration architecture 200, there can be millions of clusters 210 (clusters 210-1, . . . , 210-M as shown). The inference has a potential to execute in all of clusters 210 or in one or more subsets of clusters 210. Accordingly, the scheduling problem can be extremely complex. There are many different mechanisms to reduce the problem space, with many different topology designs. Illustrative embodiments focus on a more complex topology design, which is a dynamic inter-connected pool of clusters, where each cluster 210 can connect to many other clusters 210 within a pool, e.g., clusters 210-1 through 210-M can be considered an inter-connected pool of clusters. Inter-cluster schedule 208, inter alia, manages scheduling across clusters 210 assigned in such an inter-connected pool of clusters.

Figure 4:
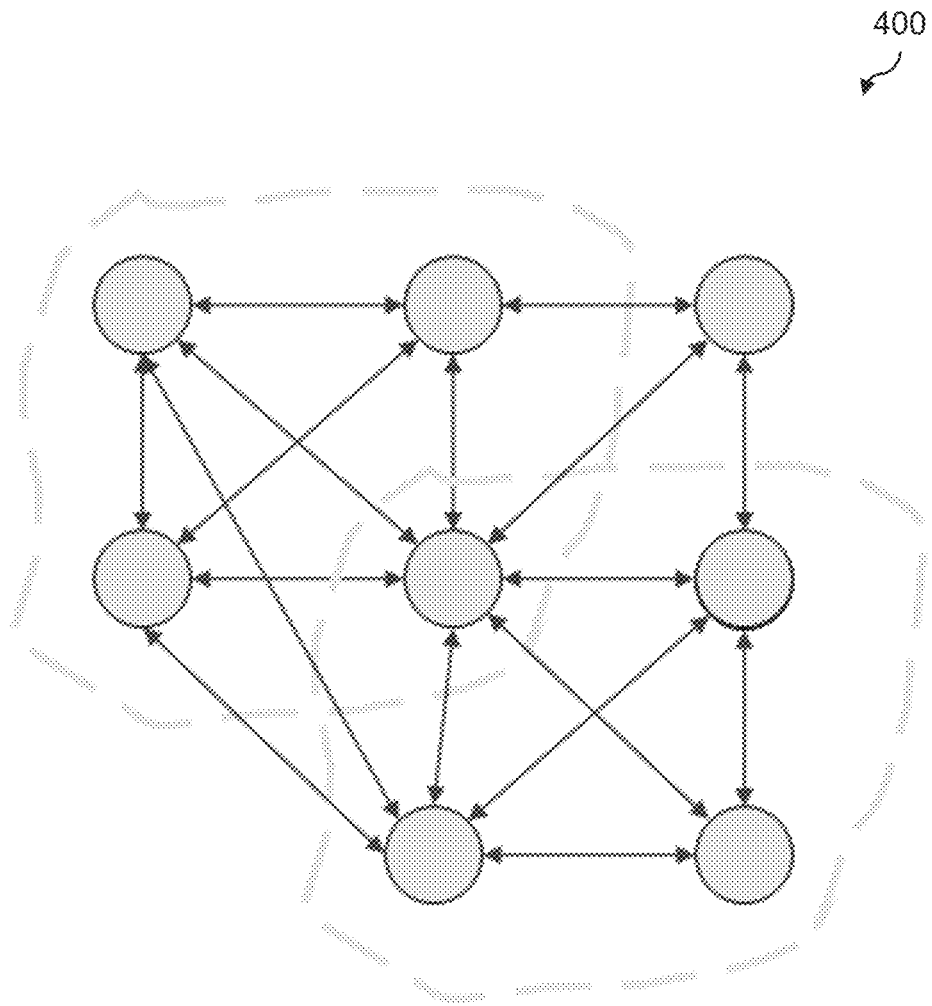
FIG. 4 illustrates an example of inter-connected cluster pools for use in schedule management for machine learning inference serving according to an illustrative embodiment.
Figure 5:
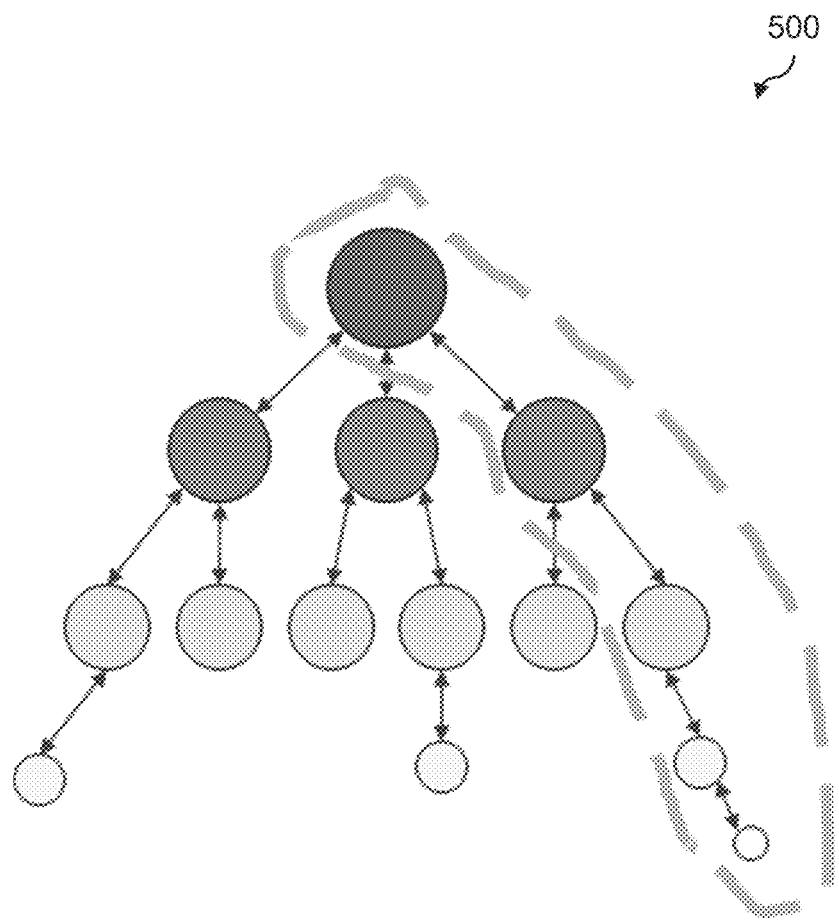
FIG. 5 illustrates an example of a dynamic tree structure topology for use in schedule management for machine learning inference serving according to an illustrative embodiment.

FIG. 4 illustrates a non-limiting example topology 400 of pools of inter-connected clusters to which clusters 210 can be assigned, e.g., each circle in the topology represents a cluster 210, and the dashed lines designate separate pools comprising subsets of clusters 210 within topology 400. It is to be appreciated that while topology 400 may be used in illustrative embodiments, scheduling techniques described herein can also be applied to other topology designs. By way of example, FIG. 5 illustrates a non-limiting example topology 500 of a tree structure of inter-connected clusters to which clusters 210 can be assigned, e.g., each circle in the topology represents a cluster 210, and the dashed line designates one pool comprising a subset of clusters 210.

There are many different algorithms to dynamically compute optimal ways of assigning clusters to individual pools or other structures based on each use case. For the purpose of this illustrative description, it is assumed that clusters have already been assigned into pools using one or more conventional cluster assignment algorithms, and inter-cluster scheduler 208 is configured with the knowledge of the topology and pool assignments of clusters 210.

For INFaaS, the problem space is different than a general-purpose inter-cluster scheduler, due to function specification of INFaaS. That is, in general, function execution is a relatively quick event unlike microservices that are typically designed as long-running workloads.

Note that while inter-cluster scheduler 208 is depicted in FIG. 2 as a single component, it is to be appreciated that inter-cluster scheduler 208 can be distributed in nature and thus can be executed inside each pool (e.g., see topologies 400 or 500) or within each cluster 210 (e.g., in conjunction with each administrator controller 212), depending on the use case. The distributed nature of inter-cluster scheduler 208 is denoted by the dashed box behind inter-cluster scheduler 208 in FIG. 2. Thus, for example, when there is an inference request received for the first time in a cluster 210, inter-cluster scheduler 208 is invoked.

In general, inter-cluster scheduler 208 computes scheduling decisions with respect to where (e.g., which cluster(s) 210) and for how long a trained ML model will execute in response to an inference request. It is assumed that the inference request contains both an input (e.g., a file pointer to the input data to be applied to the inference model to yield an output) and a model identifier (ID). FIG. 6 illustrates a non-limiting example of a scheduling decision cache 600 maintained by inter-cluster scheduler 208. Note that TTL stands for time-to-live which means the duration that a model scheduling decision will last (expiry time).

Figure 9:
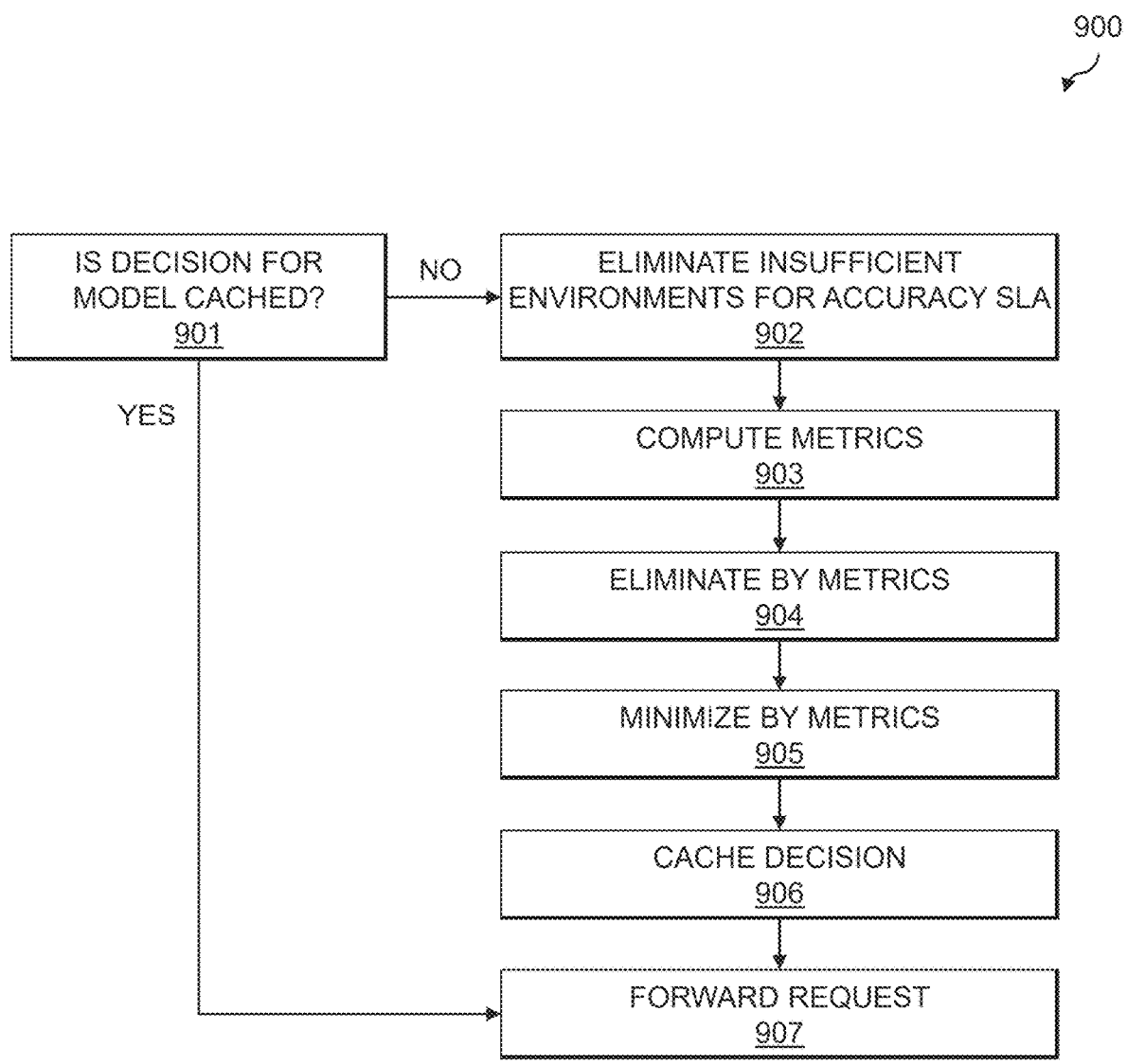
FIG. 9 illustrates a process in an orchestration architecture to provide inter-cluster schedule management for machine learning inference serving according to an illustrative embodiment.

Referring to FIG. 9, a scheduling management process performed by inter-cluster scheduler 208 will now be described in the context of a process 900.

For example, in step 901, a determination is made whether a scheduling decision has already been made and cached for a given model. Note that if a scheduling decision has already been made for a model (yes in step 901), and the decision has not expired, then the same decision will be applied and the inference request will be forwarded accordingly in step 907.

However, if the model requested cannot be found in scheduling decision cache 600 (no in step 901), then a new computation is performed by inter-cluster scheduler 208 in the context of steps 902 through 906 of process 900. Inter-cluster scheduler 208 first obtains the SLA metrics defined by developer 201. As mentioned above, default values may be used, but assume in this use case that SLA metrics such as cost, performance, and accuracy are specified by developer 201. FIG. 7 illustrates a non-limiting example of an SLA metric (type and value) table 700 maintained by inter-cluster scheduler 208.

Inter-cluster scheduler 208 also obtains resource information and cost, and collects telemetry of each cluster 210. The latency between each of the clusters 210 within a pool is also captured periodically.

When inter-cluster scheduler 208 makes a scheduling decision, in step 902, it eliminates choices of execution environments that are incapable of executing a given model matching the accuracy SLA. For example, referring back to model look-up table 300 in FIG. 3, if developer 201 defined the accuracy SLA metric to be 75%, then the minimum model to satisfy that the accuracy SLA metric is one with a standardized size of Small or a larger size. Note that FIG. 3 illustrates standardized model sizes, after compression, increasing from Tiny to Extra Small to Small to Medium to Large (note that Original refers to an uncompressed model). Thus, in this example with the accuracy metric (last column in table 300) being at least 75%, Extra Small and Tiny models are not considered and are thus eliminated in step 902. For example, if an execution environment (e.g., a sensor) does not have sufficient resources to execute a Small model, then the specific environment should not be considered.

Inter-cluster scheduler 208 determines if (local) model registry 205 of cluster 210 already contains the model, which will eliminate the download time of the model. If not, inter-cluster scheduler 208 considers the latency time to transmit from a source cluster to a target cluster. As such, performance and cost metrics are computed as follows:

Performance=Execution time+Model Download Time+Input Transmission Time

Cost=Execution Time*Infrastructure Cost

In step 903, inter-cluster scheduler 208 computes the potential execution choices for cost and performance metrics associated with clusters 210 within its pool. Since the number of clusters 210 is finite, the time it takes to compute all of these potential choices is relatively small, e.g., within about 10 milliseconds. FIG. 8 illustrates a non-limiting example of a metric (cost and performance) calculation table 800 maintained by inter-cluster scheduler 208.

In one or more illustrative embodiments, inter-cluster scheduler 208 prioritizes SLA metric types as follows: (i) accuracy; (ii) performance; and (iii) cost. Other priority schemes can be used and others priorities can be added with the addition of other SLA metric types. Based on these priorities and the calculations in table 800, inter-cluster scheduler 208 eliminates potential execution environments for the given model in step 904, and minimizes one or more of the metrics in step 905 as further explained below.

For example, inter-cluster scheduler 208 compares the computed values of performance and cost against user-defined SLAs. In one illustrative embodiment, when multiple environments can satisfy the SLA metrics, inter-cluster scheduler 208 prioritizes on minimizing cost by picking an environment with the lowest cost. When the cost of multiple environments are the same, inter-cluster scheduler 208 then prioritizes by performance and then accuracy.

With reference to table 800 in FIG. 8, by way of one example, note that Model Download Time for a Medium model at Cluster 2 and a Small model at Cluster 3 are both zero because they have already been downloaded. Both of their performance metrics will be able to satisfy the performance SLA of 50 milliseconds. However, the cost of executing in Cluster 3 is less than Cluster 2, so Cluster 3 with Intel CPU Model-1 will be picked to execute the inference with the small model.

Once the scheduling decision has been made by inter-cluster scheduler 208, the decision is stored in scheduling decision cache 600, in step 906, and the request is forwarded to the environment (i.e., the selected cluster 210) in step 907. The administrator controller 212 of administrator node 211 of the selected cluster 210 receives the inference request, and then manages the execution of the inference workload within one or more containers of worker nodes 213.

Advantageously, inter-cluster scheduler 208 takes an accuracy metric into account, performs model selection, and then calculates cost and performance metrics to determine where to run the workload. Furthermore, in an edge computing environment, inter-cluster scheduler 208 combines mechanisms from edge orchestration and model-less inference orchestration together to enable INFaaS functionalities and to give developers a cluster-less user experience. Still further, illustrative embodiments provide automation mechanisms to execute model compression and benchmark performance on different hardware environments, and then store the information for intelligent scheduling. Illustrative embodiments also enable platform developers to define different standardized sizes of models that can be used in intelligent scheduling and fit into heterogeneous execution environment of different sizes.

Figure 10:
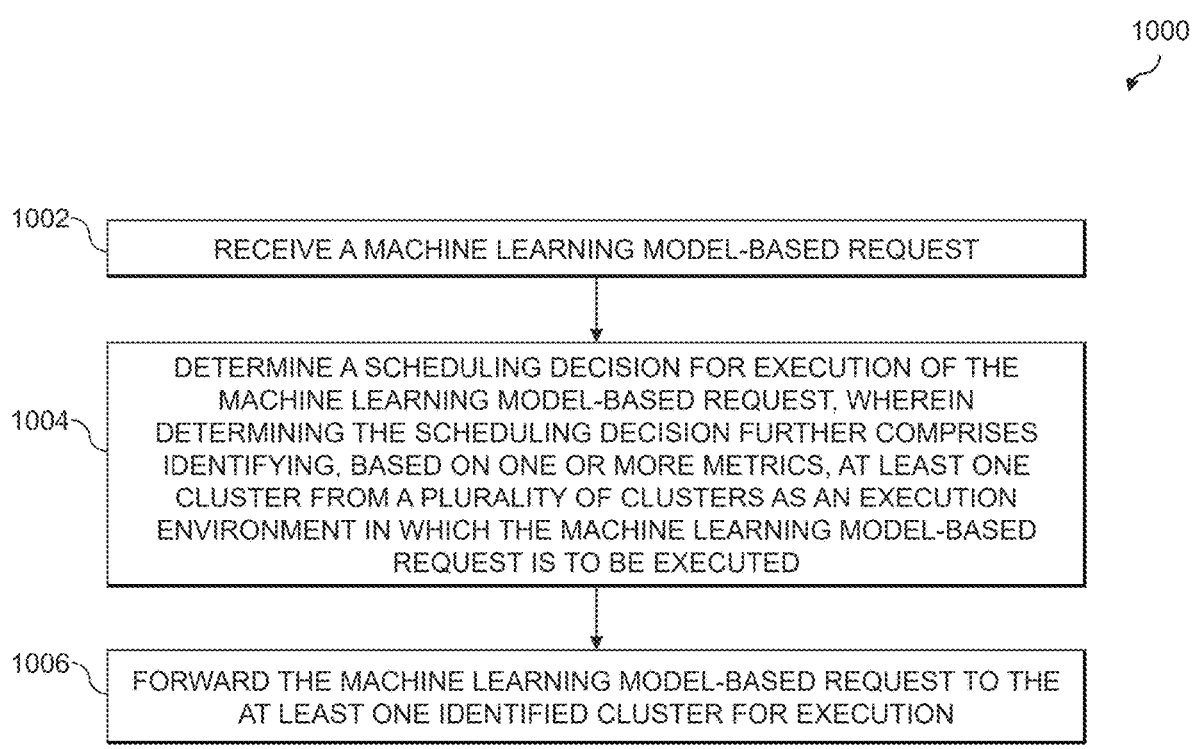
FIG. 10 illustrates a schedule management methodology for machine learning inference serving according to an illustrative embodiment.

Turning now to FIG. 10, an inter-cluster scheduling methodology 1000 for machine learning model-based processing functionality (e.g., inference serving) in a computing environment is shown. More particularly, step 1002 receives a machine learning model-based request. Step 1004 determines a scheduling decision for execution of the machine learning model-based request, wherein determining the scheduling decision further comprises identifying, based on one or more metrics, at least one cluster from a plurality of clusters as an execution environment in which the machine learning model-based request is to be executed. Step 1006 forwards the machine learning model-based request to the at least one identified cluster for execution.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement inter-cluster schedule management functionalities will now be described in greater detail with reference to FIGS. 11 and 12. Although described in the context of computing environment 100, these platforms may also be used to implement at least portions of other information processing systems in other embodiments.

Figure 11:
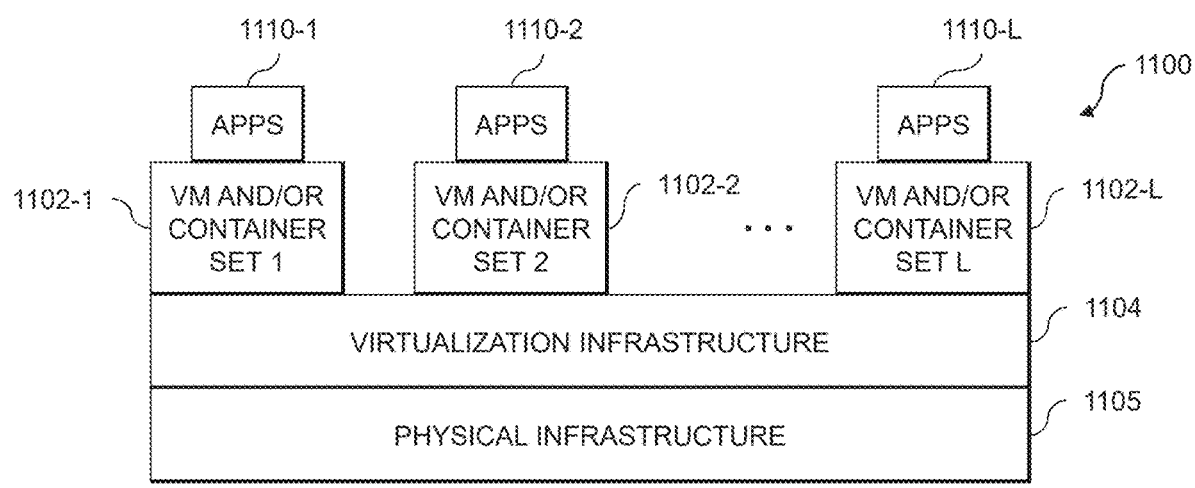
FIGS. 11 and 12 illustrate examples of processing platforms that may be utilized to implement at least a portion of an information processing system in illustrative embodiments.
Figure 12:
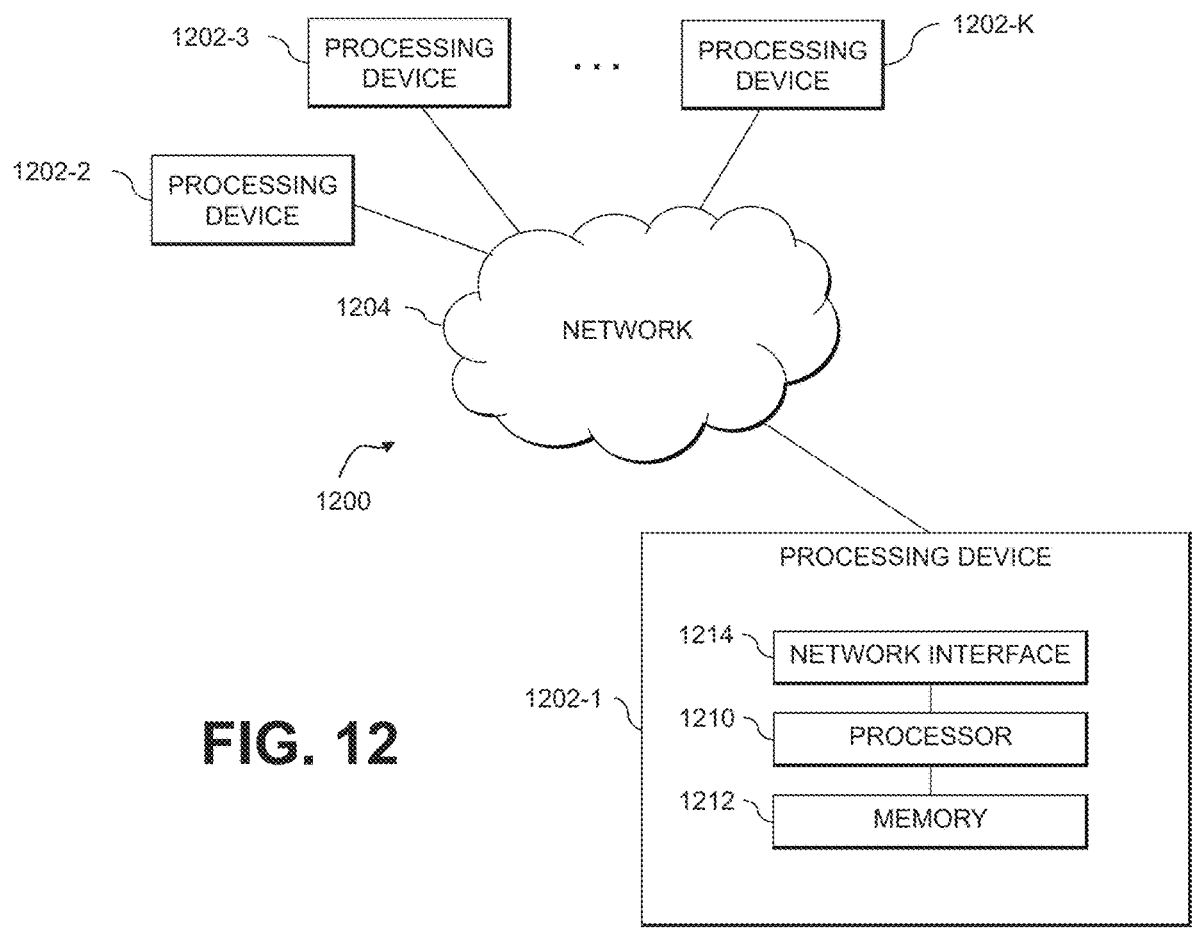

FIG. 11 shows an example processing platform comprising infrastructure 1100. The infrastructure 1100 comprises a combination of physical and virtual processing resources that may be utilized to implement at least a portion of computing environment 100 in FIG. 1. The infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The infrastructure 1100 further comprises sets of applications 1110-1, 1110-2, . . . 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of computing environment 100 may each run on a computer, server, storage device or other processing platform element. A given such element may be viewed as an example of what is more generally referred to herein as a "processing device." The infrastructure 1100 shown in FIG. 11 may represent at least a portion of one processing platform. Another example of such a processing platform is processing platform 1200 shown in FIG. 12.

The processing platform 1200 in this embodiment comprises a portion of computing environment 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and computing environment 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for managing virtualized computing resources as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, hardware, fabric connections, services, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
receiving, at an orchestration architecture of an inference-based service platform implemented within an edge computing environment, a machine learning model-based request, the machine learning model-based request comprising an identified machine learning model to be executed and a set of service level agreement criteria comprising one or more metrics, including at least an accuracy metric and one or more other metrics, wherein the identified machine learning model is one of a plurality of machine learning models saved to a model registry, and wherein the model registry comprises a plurality of sizes for each machine learning model generated before saving each machine learning model to the model registry; and
generating a scheduling decision for execution of the machine learning model-based request, comprising inputting the machine learning model-based request and the set of service level agreement criteria into a scheduling machine learning model to:
select a minimum size of the identified machine learning model for execution of the machine learning model-based request based on at least the accuracy metric of the set of service level agreement criteria;
identify, based on the minimum size of the identified machine learning model, a first subset of clusters from a plurality of clusters configured to serve as an execution environment in which the machine learning model-based request is to be executed;
compute a time duration for the machine learning model-based request to be executed and completed in each respective cluster of the first subset of clusters, wherein the time duration includes a time to transmit the minimum size of the identified machine learning model to the respective cluster;
compute, for each cluster of the first subset of clusters from the plurality of clusters, values for the one or more other metrics of the set of service level agreement criteria based on the computed time duration;
identify a second subset of clusters configured to serve as the execution environment in which the machine learning model-based request is to be executed from the first subset of clusters based on comparing the computed values for the one or more other metrics for each cluster to the one or more other metrics of the set of service level agreement criteria; and
minimize one or more of the computed values for the one or more other metrics of the second subset of clusters to select a given cluster of the second subset of clusters to serve as the execution environment and the identified machine learning model of a given size associated with the given cluster to execute the machine learning model-based request, the given size being greater than the minimum size;

wherein the receiving and determining steps are performed by at least one processor and at least one memory storing executable computer program instructions.

2. The method of claim 1, wherein the machine learning model-based request further comprises an inference serving request.

3. The method of claim 1, wherein the given cluster is selected as the execution environment when the given cluster is configured to execute the identified machine learning model of the given size within a criterion satisfying a performance metric of the one or more other metrics.

4. The method of claim 3, wherein the given cluster is selected as the execution environment when the given cluster is further configured to execute the identified machine learning model of the given size within a criterion satisfying a cost metric of the one or more other metrics.

5. The method of claim 4, wherein generating the scheduling decision further comprises prioritizing the one or more other metrics in a given order when selecting the given cluster as the execution environment in which the machine learning model-based request is to be executed.

6. The method of claim 1, wherein the given size of the identified machine learning model is a function of whether the model is compressed or uncompressed.

7. The method of claim 6, wherein the given size of the identified machine learning model is one of a defined set of standardized model sizes, and wherein the plurality of sizes for each machine learning model are within the defined set of standardized model sizes.

8. The method of claim 1, wherein the given cluster of the plurality of clusters is configured to execute the identified machine learning model of the given size as a function of a set of computing resources associated with the given cluster.

9. The method of claim 1, further comprising storing the generated scheduling decision in a data structure for potential use with a subsequent machine learning model-based request.

10. The method of claim 1, wherein determining the scheduling decision further comprises searching a data structure for a previously-stored scheduling decision for the identified machine learning model of the machine learning model-based request, and implementing the previously-stored scheduling decision for the machine learning model-based request when the searching is successful.

11. The method of claim 1, further comprising forwarding the machine learning model-based request to the given cluster for execution.

12. The method of claim 1, wherein the at least one processor and the at least one memory comprise a node in a virtualized workload orchestration framework.

13. The method of claim 12, wherein the node is part of an edge computing platform.

14. The method of claim 5, wherein the given order comprises prioritizing the accuracy metric over the performance metric and the cost metric.

15. The method of claim 14, wherein the given order comprises prioritizing the accuracy metric, then the performance metric, and then the cost metric.

16. An apparatus, comprising:
at least one processor and at least one memory storing computer program instructions wherein, when the at least one processor executes the computer program instructions, the apparatus is configured to:
receive, at an orchestration architecture of an inference-based service platform implemented within an edge computing environment, a machine learning model-based request, the machine learning model-based request comprising an identified machine learning model to be executed and a set of service level agreement criteria comprising one or more metrics, including at least an accuracy metric and one or more other metrics, wherein the identified machine learning model is one of a plurality of machine learning models saved to a model registry, and wherein the model registry comprises a plurality of sizes for each machine learning model generated before saving each machine learning model to the model registry; and
generate a scheduling decision for execution of the machine learning model-based request, comprising inputting the machine learning model-based request and the set of service level agreement criteria into a scheduling machine learning model to:
select a minimum size of the identified machine learning model for execution of the machine learning model-based request based on at least the accuracy metric of the set of service level agreement criteria;
identify, based on the minimum size of the identified machine learning model, a first subset of clusters from a plurality of clusters configured to serve as an execution environment in which the machine learning model-based request is to be executed;
compute a time duration for the machine learning model-based request to be executed and completed in each respective cluster of the first subset of clusters, wherein the time duration includes a time to transmit the minimum size of the identified machine learning model to the respective cluster;
compute, for each cluster of the first subset of clusters from the plurality of clusters, values for the one or more other metrics of the set of service level agreement criteria based on the computed time duration;
identify a second subset of clusters configured to serve as the execution environment in which the machine learning model-based request is to be executed from the first subset of clusters based on comparing the computed values for the one or more other metrics for each cluster to the one or more other metrics of the set of service level agreement criteria; and
minimize one or more of the computed values for the one or more other metrics of the second subset of clusters to select a given cluster of the second subset of clusters to serve as the execution environment and the identified machine learning model of a given size associated with the given cluster to execute the machine learning model-based request, the given size being greater than the minimum size.

17. The apparatus of claim 16, wherein the machine learning model-based request further comprises an inference serving request.

18. The apparatus of claim 16, wherein the given cluster is selected as the execution environment when the given cluster is configured to execute the identified machine learning model of the given size within a criterion satisfying a performance metric of the one or more other metrics.

19. A computer program product stored on a non-transitory computer-readable medium and comprising machine executable instructions, the machine executable instructions, when executed, causing a processing device to perform steps of:
receiving, at an orchestration architecture of an inference-based service platform implemented within an edge computing environment, a machine learning model-based request, the machine learning model-based request comprising an identified machine learning model to be executed and a set of service level agreement criteria comprising one or more metrics, including at least an accuracy metric and one or more other metrics, wherein the identified machine learning model is one of a plurality of machine learning models saved to a model registry, and wherein the model registry comprises a plurality of sizes for each machine learning model generated before saving each machine learning model to the model registry; and generating a scheduling decision for execution of the machine learning model-based request, comprising inputting the machine learning model-based request and the set of service level agreement criteria into a scheduling machine learning model to:
- select a minimum size of the identified machine learning model for execution of the machine learning model-based request based on at least the accuracy metric of the set of service level agreement criteria;
- identify, based on the minimum size of the identified machine learning model, a first subset of clusters from a plurality of clusters configured to serve as an execution environment in which the machine learning model-based request is to be executed;
- compute a time duration for the machine learning model-based request to be executed and completed in each respective cluster of the first subset of clusters, wherein the time duration includes a time to transmit the minimum size of the identified machine learning model to the respective cluster;
- compute, for each cluster of the first subset of clusters from the plurality of clusters, values for the one or more other metrics of the set of service level agreement criteria based on the computed time duration;
- identify a second subset of clusters configured to serve as the execution environment in which the machine learning model-based request is to be executed from the first subset of clusters based on comparing the computed values for the one or more other metrics for each cluster to the one or more other metrics of the set of service level agreement criteria; and
- minimize one or more of the computed values for the one or more other metrics of the second subset of clusters to select a given cluster of the second subset of clusters to serve as the execution environment and the identified machine learning model of a given size associated with the given cluster to execute the machine learning model-based request, the given size being greater than the minimum size.

20. The computer program product of claim 19, wherein the machine learning model-based request further comprises an inference serving request.

* * * * *